US007124014B1

(12) United States Patent
Ishida et al.

(10) Patent No.: US 7,124,014 B1
(45) Date of Patent: Oct. 17, 2006

(54) ELECTRONIC THROTTLE CONTROL DEVICE OF INTERNAL-COMBUSTION ENGINE

(75) Inventors: Yasuhiko Ishida, Hyogo (JP); Shunji Murao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/224,130

(22) Filed: Sep. 13, 2005

(30) Foreign Application Priority Data

Apr. 18, 2005 (JP) .......................... P2005-119842

(51) Int. Cl.
*B60T 7/12* (2006.01)
*B60T 1/00* (2006.01)

(52) U.S. Cl. ....................... 701/103; 701/115; 123/683

(58) Field of Classification Search ................ 701/101, 701/103, 104, 110–115; 123/683, 687, 462, 123/478, 479, 480
See application file for complete search history.

(56) References Cited

U.S. PATENT DOCUMENTS 5,189,621 A * 2/1993 Onari et al. ................ 701/102
5,902,210 A * 5/1999 Kobayashi et al. ......... 477/118
6,014,955 A * 1/2000 Hosotani et al. ............ 123/399
6,626,144 B1 * 9/2003 Kanamaru .................. 123/399
6,879,902 B1 * 4/2005 Nada ........................... 701/93
6,941,216 B1 * 9/2005 Isogai et al. .................. 701/96
2003/0201131 A1 * 10/2003 Maekawa et al. ........... 180/249
2005/0193977 A1 * 9/2005 Hata et al. .................. 123/350

FOREIGN PATENT DOCUMENTS

JP 01-177431 A 7/1989

* cited by examiner

*Primary Examiner*—John T. Kwon
(74) *Attorney, Agent, or Firm*—Sughrue Mion, PLLC

(57) ABSTRACT

An electronic throttle control device of an internal-combustion engine includes an electronic control unit (ECU) having a judgment function portion that judges whether an engine control system and an engine driving condition are normal, and plural kinds of pre-set characteristic conversion coefficient maps used to compute a command value of a target throttle opening degree from a manipulation quantity of the accelerator pedal. The command value of the target throttle opening degree is computed using a specific map selected from the plural kinds of characteristic conversion coefficient maps depending on the judgment result of the judgment function portion.

7 Claims, 4 Drawing Sheets

ELECTRONIC THROTTLE CONTROL DEVICE OF INTERNAL-COMBUSTION ENGINE

BACKGROUND OF THE INVENTION

1. Field of the Invention

The present invention relates to an electronic throttle control device of an internal-combustion engine configured to control a quantity of intake air to the engine by means of a specific actuator instead of driver's direct control by means of the accelerator pedal, and more particularly, to an electronic throttle control device of an internal-combustion engine suitably used as an electronic throttle control device of an engine or an outboard engine of an water eject propulsion ship that sails on water using thrust produced by ejecting water backwards.

2. Background Art

There has been an engine output control device having an electronic throttle valve provided in an intake channel of the engine and driven by an electric actuator to open/close the intake channel. This engine output control device adjusts a quantity of intake air to the engine by controlling the opening/closing of the electronic throttle value, and thereby controls an output torque of the engine. An example of the engine output control device of this kind in the related art is disclosed, for example, in JP-A-1-177431. The cited document discloses a technique to automatically switch the engine torque characteristics in response to a manipulation quantity of the accelerator pedal to suit the driver's tendency for driving manipulations. This allows the driver to drive the vehicle always with the most comfortable driving feeling.

A quantity of intake air to control the engine output is determined on the basis of a throttle opening degree. The throttle opening degree is determined on the basis of an accelerator opening degree. Hence, when the accelerator opening is increased to the fullest extent, so is the throttle opening degree, and the engine output reaches the maximum output.

However, in a case where the maintenance of the hydraulic system or the cooling system of the engine is poor, when the engine output control is performed in response to the accelerator opening degree adjusted by the driver, the engine may be damaged by overheating. Also, when an inexperienced driver starts a small jet propulsion ship by carelessly manipulating the accelerator pedal to the fullest extent, the ship may be accelerated abruptly, which possibly makes the driving condition unstable.

SUMMARY OF THE INVENTION

The invention was devised to solve the problems as discussed above, and therefore has an object to obtain an electronic throttle control device of an internal-combustion engine capable of controlling an engine output appropriately depending on the operating condition of the engine control system, the driving condition of the engine, or the driver's manipulation skills.

An electronic throttle control device of an internal-combustion engine of the invention controls an engine output by computing a quantity of a throttle opening degree on the basis of a manipulation quantity of an accelerator pedal by a driver by means of a computation portion in an electronic control unit, and by controlling a throttle opening degree using a specific actuator on the basis of a computed command value of the throttle opening degree. The electronic control unit includes a judgment function portion that judges whether an engine control system and an engine driving condition are normal, and plural kinds of pre-set characteristic conversion coefficient maps used to compute the command value of a target throttle opening degree from the manipulation quantity of the accelerator pedal. The command value of the target throttle opening degree is computed by selecting a specific map from the plural kinds of characteristic conversion coefficient maps depending on a judgment result of the judgment function portion.

Also, one of the plural kinds of characteristic conversion coefficient maps has a characteristic conversion coefficient value with the coefficient value being set in one of a direction to lower the throttle opening degree to be smaller and a direction to increase the throttle opening degree to be larger than in normal condition depending on a driver's manipulation skills. In addition, the electronic control unit selectively uses a characteristic conversion coefficient map that matches with the manipulation skills at a command from a characteristic switching portion, so that the driver is allowed to change an engine output characteristic arbitrarily by manipulating the characteristic switching portion.

The electronic throttle control device of an internal-combustion engine of the invention is able to compute an optimum quantity of the throttle opening degree depending not only on a manipulation quantity of the accelerator pedal by the driver, but also on the operating conditions of the sensors and actuators forming the engine control system, the driving condition of the engine, such as the engine temperature and an engine oil pressure, and further the driver's manipulation skills. It is thus possible to control the engine output to best suit the situations.

In other words, when a failure is detected in a sensor input or an actuator used for the engine control, a stable save running is enabled by lowering the engine output so that the throttle opening degree will not be increased to be larger than in normal condition.

Also, when a defect is detected in the engine cooling system or in the lubrication system, overheating of the engine can be suppressed by lowering the engine output so that the throttle opening degree will not be increased to be larger than in normal condition. It is thus possible to prevent damages on the engine.

Moreover, because the engine output can be changed depending on the driver's manipulation skills, the maximum output of the engine can be suppressed even when an inexperienced driver carelessly manipulates the accelerator pedal to the fullest extent. It is thus possible to prevent an unstable driving resulted from abrupt acceleration.

THE BEST MODE FOR CARRYING OUT THE INVENTION

First Embodiment

Hereinafter, a first embodiment of the invention will be described with reference to the drawings.

Figure 1:
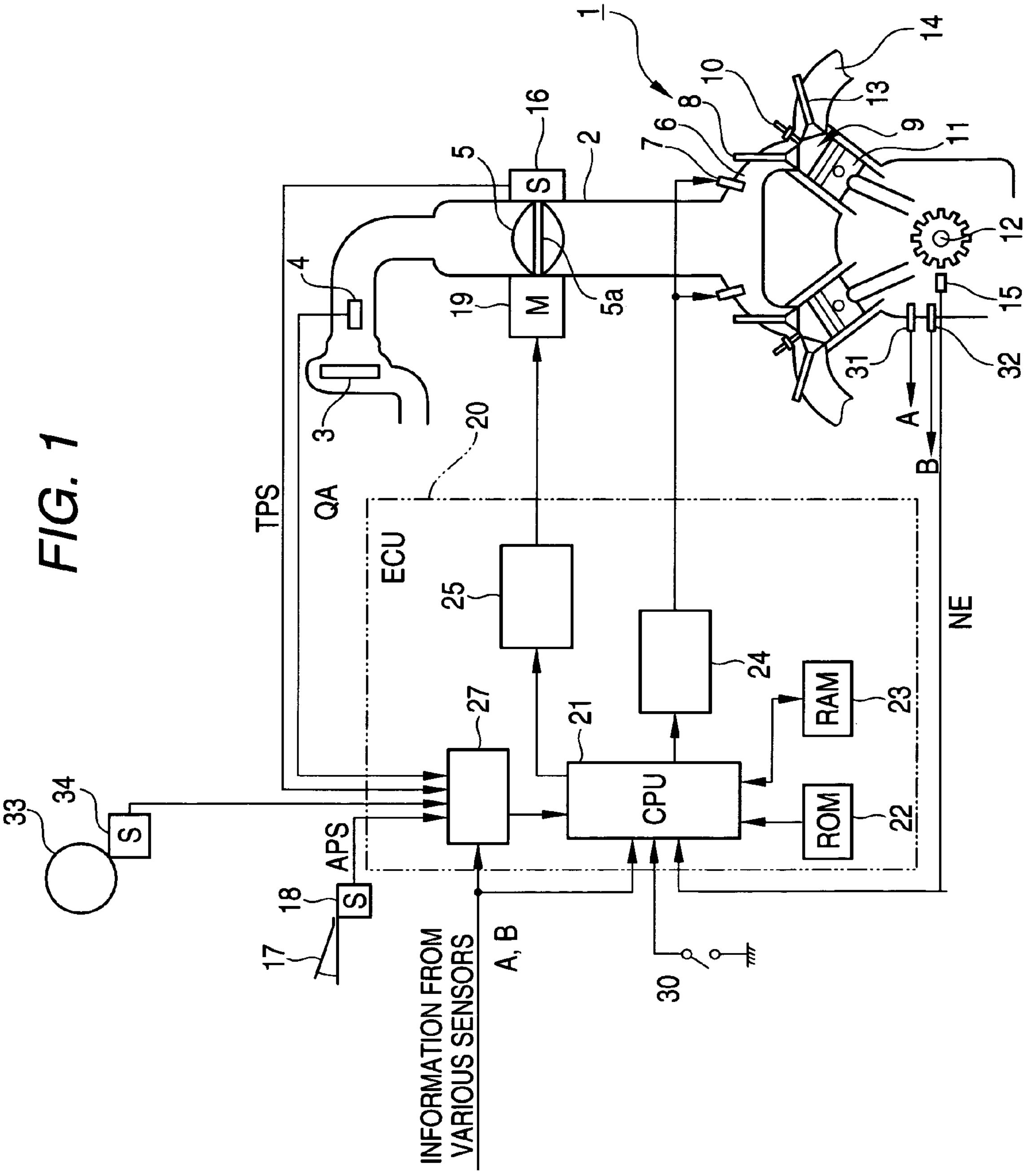
FIG. 1 is a view schematically showing the configurations of a control system of an internal-combustion engine adopting an electronic throttle control device of an internal-combustion engine according to a first embodiment of the invention and peripheral equipment.

FIG. 1 is a view schematically showing the configurations of a control system of an internal-combustion engine adopting an electronic throttle control device of an internal-combustion engine according to the first embodiment of the invention and peripheral equipment.

Referring to FIG. 1, an air cleaner 3 is provided upstream of an intake channel 2 of an internal-combustion engine 1. An air flow sensor 4 that detects a quantity of intake air is provided downstream of the air cleaner 3.

A throttle valve 5 is provided downstream of the air flow sensor 4 in the intake channel 2. A throttle opening degree TPS, which is the actual opening degree of the throttle valve 5, is controlled by a driving force of an electric motor 19 linked to a rotating shaft 5*a* of the throttle valve 5, and a quantity of intake air supplied to the internal-combustion engine 1 is adjusted. The throttle opening degree TPS of the throttle valve 5 is detected by a throttle opening degree sensor 16.

The intake channel 2 is connected to all the cylinders in the internal-combustion engine 1 via an intake manifold 6. Intake air flowing through the intake channel 2 is thus distributed and supplied to the respective cylinders by passing through the intake manifold 6.

The intake manifold 6 is provided with injectors 7 corresponding to the respective cylinders, and fuel injected from the respective injectors 7 is mixed with intake air and supplied to the respective cylinders.

The air-fuel mixture is guided to the interior of a combustion chamber 9 defined in each cylinder in association with the opening and closing of a corresponding intake valve 8, and is ignited by a sparking plug 10 for combustion. A piston 11 is depressed by combustion of the air-fuel mixture and a torque is provided to a crank shaft 12.

A burned, exhaust gas is discharged to the outside by passing through an exhaust channel 14 in association with the opening and closing of an exhaust valve 13. A crank angle sensor 15 is provided at a position close proximity to the crank shaft 12. The crank angle sensor 15 outputs a pulse signal at every specific crank angle.

The internal-combustion engine 1 is provided with an engine temperature sensor 31 that detects an engine temperature, and an engine oil pressure sensor 32 that detects an internal oil pressure of the engine.

Numeral 30 denotes an engine characteristic changeover switch (hereinafter, referred to also as a characteristic switching device) that enables the driver to switch the engine output characteristics. Numeral 33 denotes a steering wheel that enables the driver to navigate the vehicle. Numeral 34 denotes a steering sensor that detects a steering quantity of the steering wheel 33.

Numeral 20 denotes an electronic control unit (hereinafter, abbreviated as ECU). The ECU 20 chiefly comprises a micro computer composed of a CPU 21, a ROM 22, a RAM 23, etc. that drive the injectors 7 under control on the basis of an intake air quantity signal QA detected in the air flow sensor 4, an engine speed signal NE detected in the crank angle sensor 15 and the like, and control the opening and closing of the throttle valve 5 on the basis of a throttle opening degree signal TPS detected in the throttle opening degree sensor 16, an accelerator opening degree signal APS detected in the accelerator opening degree sensor 18 that detects an opening degree of an accelerator pedal 17 and the like.

In the ECU 20, the CPU 21 serves as a central processor that reads out the intake air quantity signal QA and the engine speed signal NE, and further the throttle opening degree signal TPS, the accelerator opening degree signal APS, etc., and computes a necessary fuel injection quantity from the injectors 7 that varies each time depending on the driving condition of the internal-combustion engine 1, and a target throttle opening degree, that is, a command value to be achieved by the electric motor 19 as the target of the throttle valve 5.

The ROM 22 is a memory serving as a program memory that pre-installs various control programs to control the driving condition of the internal-combustion engine 1.

The CPU 21 performs various kinds of computation processing by running the programs pre-installed in the ROM 22. The RAM 23 is a memory serving as a so-called data memory to temporarily store input/output data in/from various sensors, computation processing data from the CPU 21, etc.

An analog-to-digital conversion circuit 27 is a circuit that applies analog-to-digital conversion to the intake air quantity signal QA, the throttle opening degree signal TPS, and the accelerator opening degree signal APS that have been read out, and information from various sensors, such as the steering sensor 34, the engine temperature sensor 31, and the engine oil pressure sensor 32, and outputs the result to the CPU 21.

An injector driving circuit 24 is a circuit that drives the injectors 7 with a signal having a specific pulse width corresponding to a fuel injection quantity calculated in the CPU 21 on the basis of the intake air quantity signal QA and the engine speed signal NE. The injectors 7 thereby supply fuel to the corresponding cylinders in the internal-combustion engine 1 by injecting fuel in a quantity corresponding to the fuel injection quantity calculated in the CPU 21.

A motor driving circuit 25 is a circuit that outputs, to the electric motor 19, an output duty (a quantity of control) calculated through computation processing by the CPU 21 in response to a deviation of the throttle opening degree signal TPS outputted from the throttle opening degree sensor 16 from the target throttle opening degree of the throttle valve 5 for lessening the deviation. The electric motor 19 thereby generates a driving force corresponding to the output duty, and the throttle opening degree signal TPS of the throttle valve 5 detected in the throttle opening degree sensor 16 is thus adjusted to agree with the target throttle opening degree in the end.

The processing procedure of the target throttle opening degree computation by the CPU 21 in the ECU 20 used in the electronic throttle control device of the internal-combustion engine 1 according to the first embodiment of the invention will now be described with reference to the flowchart in FIG. 2.

Figure 2:
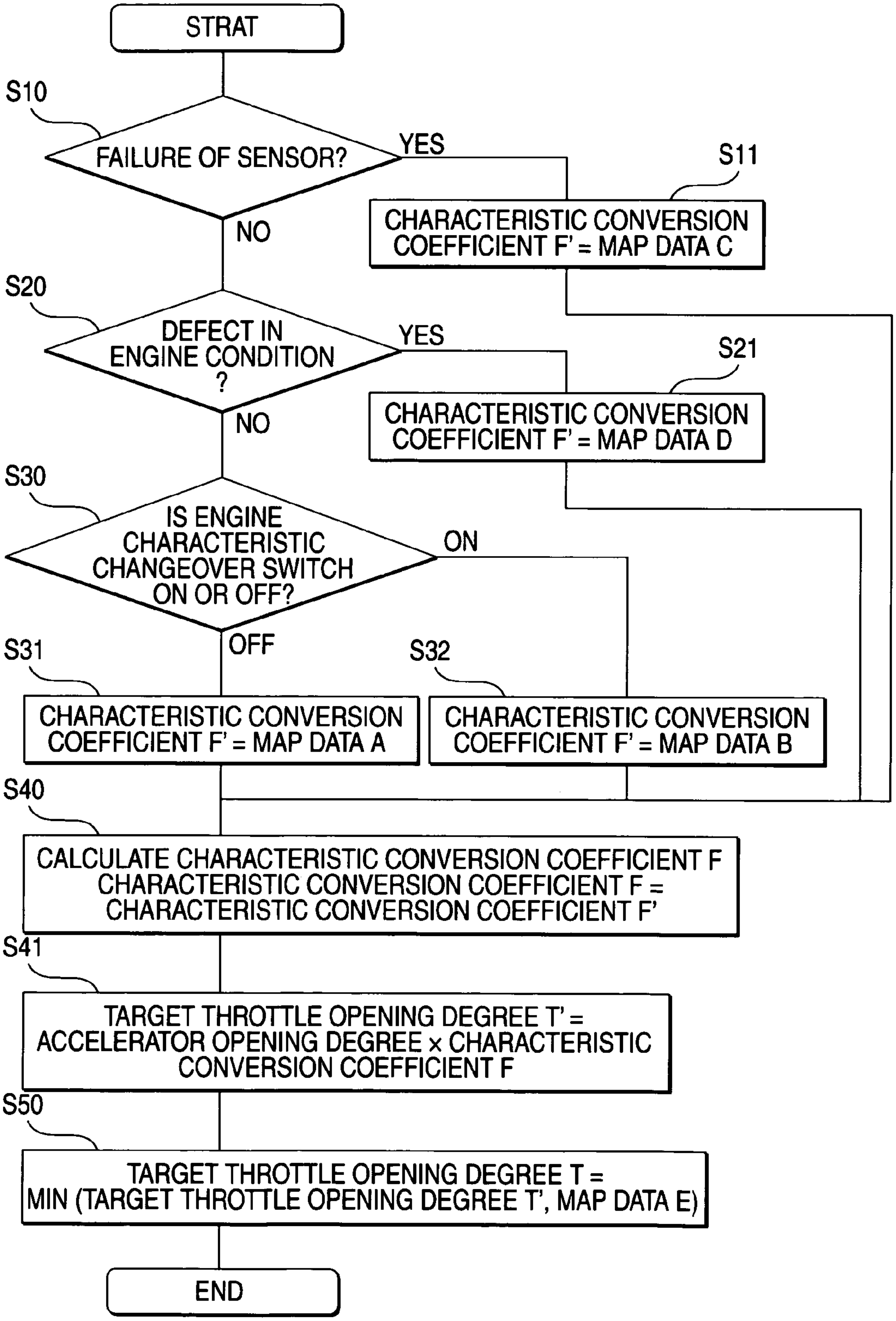
FIG. 2 is a flowchart detailing the processing procedure of a target throttle opening degree computation in the first embodiment of the invention.

Referring to FIG. 2, in Step S10, a judgment function portion in the ECU 20 judges whether the respective sensors in the engine control system are in normal condition. When they are in normal condition, the flow proceeds to Step S20; otherwise the flow proceeds to Step S11 in which map data C is set to a characteristic conversion coefficient F', after which the flow proceeds to Step S40.

In Step S20, the engine temperature and the engine oil pressure are confirmed and the absence or presence of a defect in the engine, such as a high temperature or a low oil pressure, is judged. In the absence of a defect, the flow proceeds to Step S30, and when the presence of a defect is confirmed, the flow proceeds to Step S21 in which map data D is set to the characteristic conversion coefficient F', after which the flow proceeds to Step S40.

In Step S30, whether the engine characteristic changeover switch is ON or OFF is confirmed. When the switch is ON, the flow proceeds to Step S32 in which map data B is set to the characteristic conversion coefficient F', after which the flow proceeds to Step S40. When the switch is OFF, the flow proceeds to Step S31 in which map data A is set to the characteristic conversion coefficient F', after which the flow proceeds to Step S40.

Figure 3:
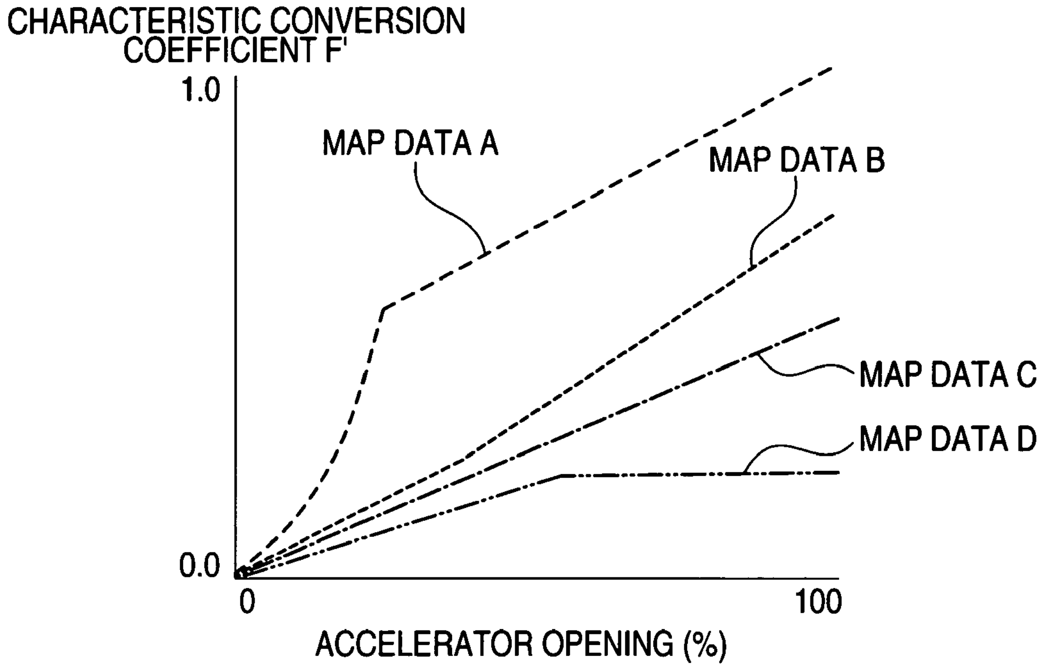
FIG. 3 is a view showing characteristic conversion coefficient map data used when a target throttle opening degree is found from an accelerator opening degree in the first embodiment of the invention.

The map data A, B, C, and D referred to herein is, as is shown in FIG. 3, the data of characteristic conversion coefficient maps in which are set characteristic conversion coefficients used to compute the command value of the target throttle opening degree from a manipulation quantity of the accelerator pedal, using the accelerator opening degree as a parameter.

As has been described, coefficient values corresponding to normal driving are set in the map data A, and coefficient values corresponding to a case where the engine output characteristic is changed (lowered to be smaller than in normal condition) depending on the driver's manipulation skills are set in the map data B. Also, coefficient values corresponding to a case where there is a defect in any of various sensors in the engine control system are set in the map data C, and coefficient values corresponding to a case where there is a defect in the driving condition of the engine, such as the engine temperature, are set in the map data D.

In addition, the map data A, B, C, and D, that is, the values of the conversion coefficients of the characteristic conversion coefficient maps per se are set in advance by taking the output characteristic of the engine into account. The characteristic conversion coefficient maps of various kinds, in which the characteristic conversion coefficients are set to different values depending on the driving conditions of the engine, are stored in the ROM 22.

In Step S40, the characteristic conversion coefficient to be selected for use is found on the basis of the characteristic conversion coefficient F', that is, any of the map data A through D.

It should be noted, however, that when the judgment results are different from the earlier ones in Steps S10, S20, and S30 and the map data to be selected is switched, a limit value K is set to a variance in change from the values of the earlier characteristic conversion coefficients, so that the characteristic conversion coefficients are varied step-by-step. This enables filtering processing to be performed.

A target quantity in change of the throttle is thus limited when the map data is switched, which can in turn suppress an abrupt fluctuation of the engine torque.

In Step S41, the target throttle opening degree T' is computed using the accelerator opening degree and the characteristic conversion coefficient F found in Step S40 in accordance with the equation as follows:

$$\text{target throttle opening degree } T' = \text{accelerator opening degree} \times \text{characteristic conversion coefficient } F$$

Figure 4:
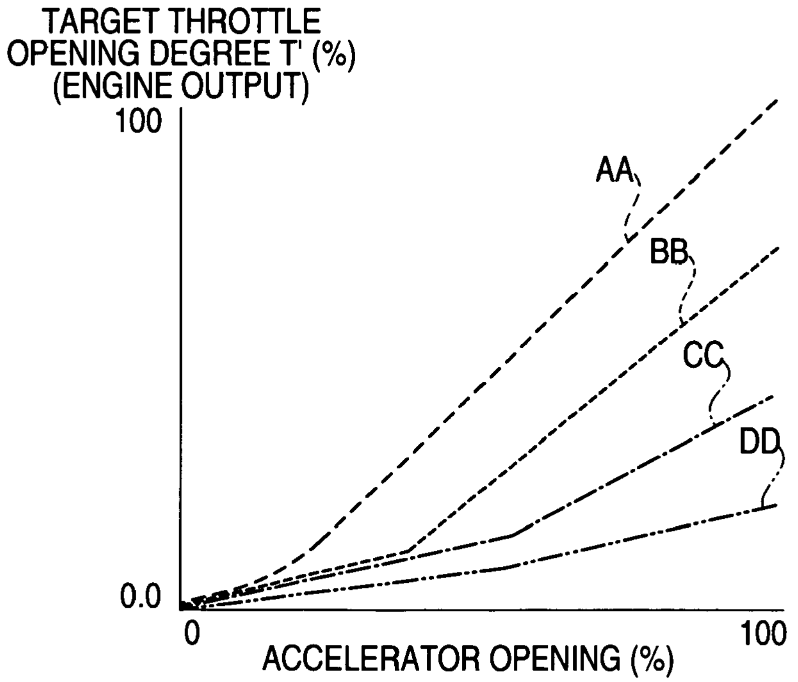
FIG. 4 is a view showing the relation between the accelerator opening degree and the target throttle opening degree in the first embodiment of the invention.

The relation between the accelerator opening degree and the target throttle opening degree T' found in accordance with the equation above using the map data A through D shown in FIG. 3 is shown in FIG. 4 for the respective judgment results in Steps S10, S20, and S30. Referring to FIG. 4, a line AA, a line BB, a line CC, and a line DD show, respectively, the relations between the accelerator opening degree and the target throttle opening degree T' when the map data A, B, C, and D are used. As is obvious from FIG. 4, even when the inputs of the accelerator opening degree are the same, it is possible to adjust the target throttle opening degree to be optimum depending on the various conditions. It is thus possible to control the engine output in the most suitable manner.

In other words, the map data A is the map data for the characteristic conversion coefficient used in normal condition. It is set to lower the target throttle opening degree when the accelerator opening degree is small. Hence, it suppresses a fluctuation of torque from the idling region where the accelerator opening degree starts to increase. When the accelerator opening degree is increased to the fullest extent, so is the target throttle opening degree, and the engine output reaches the maximum.

The map data B is the map data for the characteristic conversion coefficient used when the engine output characteristic is lowered depending on the driver's driving skills, and it is selected when the engine characteristic changeover switching is switched ON. In comparison with the map data A, it is set to lower the target throttle opening degree by lowering the data value in the entire range of the accelerator opening degrees. Hence, even when the accelerator opening is increased to the fullest extent, the target throttle opening degree is not increased to the fullest extent. Hence, the maximum output of the engine can be suppressed.

The map data C is the map data for the characteristic conversion coefficient used when a defect occurs in the engine control system, such as a failure of a sensor. It is set to further lower the characteristic conversion coefficient value in comparison with the map data B, so that the engine output is suppressed across the entire region of the accelerator opening degrees. This enables a running while suppressing a runway resulted from the unstable system.

The map data D is the map data for the characteristic conversion coefficient used when a defect occurs in the driving condition of the engine, for example, when the engine temperature reaches or exceeds the allowable value or when the engine oil pressure is dropped to a specific value or below. The engine output across the entire region of the accelerator opening degrees can be thus suppressed. This enables the least possible save running while preventing damages on the engine.

In Step S50, the target throttle opening degree T is found using the value of the target throttle opening degree T' found in Step S41 or the map data value E, whichever is the smaller, at which point the routine is completed.

Figure 5:
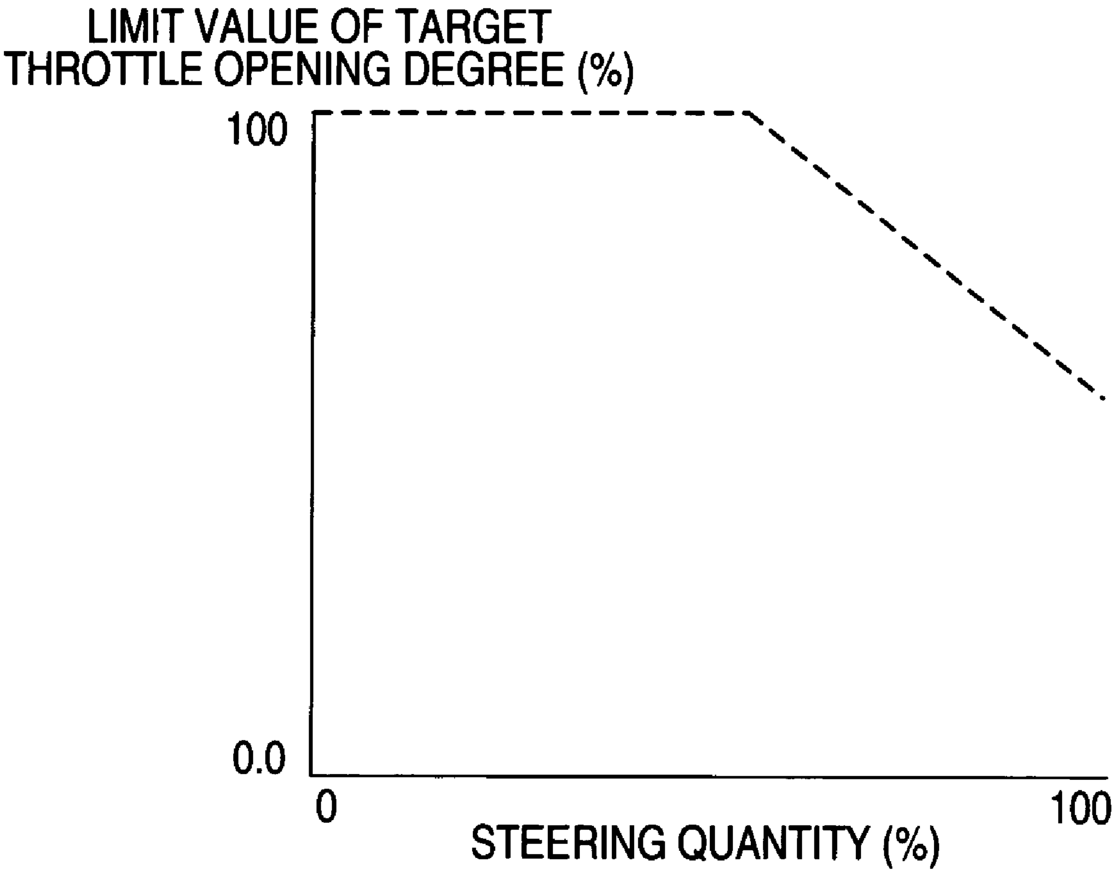
FIG. 5 is a view showing the maximum value of the target throttle opening degree in response to a steering quantity in the first embodiment of the invention.

The map data E referred to herein is shown in FIG. 5. It is the map of the throttle opening degree limit value to set the upper limit to the throttle opening degree in response to a steering quantity when the steering angle is equal to or larger than a specific value, using a steering quantity of the steering wheel detected in the steering sensor 34 as a parameter. The maximum allowable throttle opening degree for each steering quantity is set in the map data E.

The feedback control is performed on the throttle valve 5 of FIG. 1 on the basis of the target throttle opening degree calculated in Step S50.

As has been described, the electronic throttle control device according to the first embodiment of the invention is able to control the engine output by computing the optimum quantity of the throttle opening degree on the basis of not only a driver's intended manipulation quantity of the accelerator pedal, but also the condition of the engine control system, and the driving condition of the engine, such as the engine temperature and the engine oil pressure.

Hence, for example, when a failure is detected in the sensor input or in the actuator used for the engine control, or when a defect is detected in the engine cooling system or the lubricating system, the engine output is lowered to be smaller than in normal condition by switching the characteristic conversion coefficients that convert the manipulation quantity of the accelerator pedal to the throttle opening degree in a direction not to increase the throttle opening degree to be larger than in normal condition. This enables a stable running by avoiding a runway resulted from the unstable system.

In addition, it is possible to prevent damages on the engine by suppressing the overheating of the engine.

Also, because the engine output can be changed arbitrarily depending on the driver's driving skills, for example, when the output is lowered using the engine characteristic changeover switch, the maximum output of the engine can be suppressed. Hence, when an inexperienced driver carelessly manipulates the accelerator pedal to the fullest extent, it is possible to prevent unstable driving resulted from abrupt acceleration.

Conversely, when the output is enhanced with the engine characteristic changeover switch, an engine output at high power can be obtained by increasing the accelerator opening degree slightly. It is thus possible to obtain an abrupt acceleration characteristic for rather recreation-oriented use. In other words, it is possible to obtain the acceleration characteristic and the highest speed depending on the driver's driving skills. Hence, whether the driver is less experienced or well experienced, the driver is able to run the vehicle comfortably.

Further, when the characteristic conversion coefficient maps (map data) to be selected are switched, a deceleration shock at initial output suppression can be mitigated by changing the coefficient value step-by-step by providing a certain cycle.

Further, because the engine output can be controlled depending not only on the manipulation quantity of the accelerator pedal by the driver, but also on the steering angle of the steering wheel, a stable running can be ensured while the steering wheel is manipulated

What is claimed is:

1. An electronic throttle control device of an internal-combustion engine that controls an engine output by computing a quantity of a throttle opening degree on the basis of a manipulation quantity of an accelerator pedal by a driver by means of a computation portion in an electronic control unit, and by controlling a throttle opening degree using a specific actuator on the basis of a computed command value of the throttle opening degree, wherein the electronic control unit includes:

a judgment function portion that judges whether an engine control system and an engine driving condition are normal; and plural kinds of pre-set characteristic conversion coefficient maps used to compute the command value of a target throttle opening degree from the manipulation quantity of the accelerator pedal, and wherein the command value of the target throttle opening degree is computed by selecting a specific map from the plural kinds of characteristic conversion coefficient maps depending on a judgment result of the judgment function portion.

2. The electronic throttle control device of an internal-combustion engine according to claim 1, wherein:

one of the plural kinds of characteristic conversion coefficient maps has a characteristic conversion coefficient value corresponding to a case where a defect occurs in one of a sensor and an actuator forming the engine control system with the coefficient value being set in a direction to lower the throttle opening degree to be smaller than in normal condition, and is selected and used when the defect occurs in one of the sensor and the actuator.

3. The electronic throttle control device of an internal-combustion engine according to claim 1, wherein:

one of the plural kinds of characteristic conversion coefficient maps has a characteristic conversion coefficient value corresponding to a case where a defect occurs in a driving condition of the engine with the coefficient value being set in a direction to lower the throttle opening degree to be smaller than in normal condition; and the judgment function portion of the electronic control unit judges the defect of the driving condition of the engine on the basis of detection information from a detection unit that detects an engine speed, an engine temperature, and an engine oil pressure in one of the following cases: (1) where the engine speed reaches or exceeds an allowable engine speed, (2) where the engine temperature reaches or exceeds an allowable temperature, and (3) where the engine speed reaches or exceeds a specific engine speed and the engine oil pressure is dropped to a specific pressure or below, and selects and uses a characteristic conversion coefficient map that suits a condition of the defect.

4. The electronic throttle control device of an internal-combustion engine according to claim 1, wherein:

one of the plural kinds of characteristic conversion coefficient maps has a characteristic conversion coefficient value with the coefficient value being set in one of a direction to lower the throttle opening degree to be smaller and a direction to increase the throttle opening degree to be larger than in normal condition depending on driver's manipulation skills; and the electronic control unit selectively uses a characteristic conversion coefficient map that matches with the manipulation skills at a command from a characteristic switching portion, so that the driver is allowed to change an engine output characteristic arbitrarily by manipulating the characteristic switching portion.

5. The electronic throttle control device of an internal-combustion engine according to claim 1, wherein:

when a characteristic conversion coefficient map to be selected is switched, a limit is set to a variance in change from a previous value of the characteristic conversion coefficient, so that the coefficient value varies step-by-step.

6. The electronic throttle control device of an internal-combustion engine according to claim 1, wherein:

the electronic control unit includes a value limiting map of the throttle opening degree in which an upper limit of the throttle opening degree is set in response to a steering quantity when a steering angle of a steering wheel is equal to or larger than a specific angle, so that when the steering angle is equal to or larger than the specific value, a limit is set in a direction to lower the throttle opening degree to be smaller than in normal condition to suppress the engine output, on the basis of a signal from a steering sensor.

7. The electronic throttle control device of an internal-combustion engine according to claim 1, wherein:

the electronic throttle control device is used as one of an engine and an outboard engine of a water eject propulsion ship that is propelled by thrust produced by ejecting water pressurized in a jet propulsion device backward from an ejection nozzle.

* * * * *